US008241745B2

(12) United States Patent
Dietsche et al.

(10) Patent No.: US 8,241,745 B2
(45) Date of Patent: Aug. 14, 2012

(54) ESSENTIALLY CHROMIUM-FREE METHOD FOR PASSIVATING METALLIC SURFACES CONSISTING OF ZN, ZN ALLOYS, AL OR AL ALLOYS

(75) Inventors: Frank Dietsche, Schriesheim (DE); Frank Klippel, Ludwigshafen (DE); Matthias Klüglein, Ludwigshafen (DE); Alexander Göthlich, Mannheim (DE)

(73) Assignee: BASF SE, Ludwigshafen (DE)

( * ) Notice: Subject to any disclaimer, the term of this patent is extended or adjusted under 35 U.S.C. 154(b) by 801 days.

(21) Appl. No.: 10/595,494

(22) PCT Filed: Oct. 15, 2004

(86) PCT No.: PCT/EP2004/011641

§ 371 (c)(1), (2), (4) Date: Oct. 23, 2006

(87) PCT Pub. No.: WO2005/042801

PCT Pub. Date: May 12, 2005

(65) Prior Publication Data

US 2007/0082193 A1 Apr. 12, 2007

(30) Foreign Application Priority Data

Oct. 23, 2003 (DE) .................................. 103 49 728

(51) Int. Cl.
*B32B 15/082* (2006.01)
*B05D 3/02* (2006.01)

(52) U.S. Cl. ........ 428/336; 428/332; 428/457; 428/461; 428/624; 427/372.2; 427/388.2; 427/388.4

(58) Field of Classification Search ........................ None
See application file for complete search history.

(56) References Cited

U.S. PATENT DOCUMENTS

| | | | | |
|---|---|---|---|---|
| 2,838,421 | A * | 6/1958 | Sohl | 442/136 |
| 4,126,595 | A * | 11/1978 | Martorano et al. | 524/512 |
| 4,384,902 | A | 5/1983 | Crotty et al. | |
| 6,040,054 | A | 3/2000 | Odashima et al. | |
| 6,287,704 | B1 | 9/2001 | Preikschat et al. | |
| 6,514,357 | B1 | 2/2003 | Tada et al. | |
| 6,777,096 | B2 | 8/2004 | Shiba et al. | |
| 7,291,402 | B2 * | 11/2007 | Kazuhisa et al. | 428/626 |

FOREIGN PATENT DOCUMENTS

| | | | |
|---|---|---|---|
| CA | 2 312 807 | | 6/1999 |
| CA | 2 374 539 | A1 | 11/2000 |
| DE | 195 16 765.1 | | 11/1996 |
| DE | 197 54 108.9 | | 6/1999 |
| DE | 199 23 084.6 | A1 | 11/2000 |
| EP | 163151 | A * | 12/1985 |
| EP | 0 787 830 | | 8/1997 |
| EP | 1 130 131 | A2 | 9/2001 |
| EP | 1361248 | A | 11/2003 |
| GB | 1 312 097 | | 4/1973 |
| JP | 54159447 | | 12/1979 |
| JP | 56-000279 | | 1/1981 |
| JP | 07242860 | | 9/1995 |
| JP | 2000-204485 | A | 7/2000 |
| JP | 2001-214283 | A | 8/2001 |
| JP | 2001-316845 | A | 11/2001 |
| JP | 2001-348535 | | 12/2001 |
| JP | 2001-348535 | A | 12/2001 |
| JP | 2002-326310 | | 11/2002 |
| JP | 2002-327096 | | 11/2002 |
| JP | 2002-348523 | | 12/2002 |
| JP | 2002-348523 | A | 12/2002 |
| JP | 2003-027254 | | 1/2003 |
| KR | 2001-0024643 | | 3/2001 |
| WO | WO-97/40208 | A1 | 10/1997 |
| WO | WO-99/29927 | | 6/1999 |
| WO | WO-01/30513 | | 5/2001 |
| WO | WO-2004/074372 | | 9/2004 |

* cited by examiner

*Primary Examiner* — Monique Jackson
(74) *Attorney, Agent, or Firm* — Connolly Bove Lodge & Hutz LLP

(57) ABSTRACT

The present invention relates to a substantially chromium-free process for passivating metallic surfaces of Zn, Zn alloys, Al or Al alloys by treating the surface with an acidic aqueous formulation which comprises at least one substantially non-crosslinked, water-soluble polymer or copolymer containing at least 50% by weight of (meth)acrylic acid units and comprises water or an aqueous solvent mixture comprising at least 50% by weight of water, and by further treating the surface with at least one water-soluble crosslinker comprising at least 2 crosslinking groups selected from the group consisting of azirane, oxirane, and thiirane groups. The invention further relates to passivating layers obtainable by means of the process and to a formulation suitable for this process.

18 Claims, No Drawings

ESSENTIALLY CHROMIUM-FREE METHOD FOR PASSIVATING METALLIC SURFACES CONSISTING OF ZN, ZN ALLOYS, AL OR AL ALLOYS

CROSS REFERENCE TO RELATED APPLICATIONS

This application is a National Stage entry under 35 U.S.C. §371 of PCT/EP2004/011641 filed on Oct. 15, 2004. International application PCT/EP2004/011641 claims priority to German application 103 49 728.5 filed on Oct. 23, 2003, the entire of contents of which is incorporated by reference herein.

The present invention relates to a substantially chromium-free process for passivating metallic surfaces of Zn, Zn alloys, Al or Al alloys by treating the surface with an acidic aqueous formulation which comprises at least one substantially non-crosslinked, water-soluble polymer or copolymer containing at least 50% by weight of (meth)acrylic acid units and comprises water or an aqueous solvent mixture comprising at least 50% by weight of water, and by further treating the surface with at least one water-soluble crosslinker comprising at least 2 crosslinking groups selected from the group consisting of azirane, oxirane, and thiirane groups. The invention further relates to passivating layers obtainable by means of the process and to a formulation suitable for this process.

The corrosion protection treatment of modern metallic materials normally takes place in multistage operations, and the surface of treated metals normally has a number of different layers.

The protection of metallic components against corrosion is of great economic importance. At the same time the requirements imposed on the corrosion protection are also becoming ever more stringent. An example of this is that the newer models of automobile are nowadays warranted with a guarantee of up to 12 years against rust perforation.

Of particular importance both technically and economically is the corrosion protection treatment of aluminum surfaces and also of the surfaces of galvanized metals, especially electrochemically galvanized or hot-dip galvanized iron and steel. The corrosion protection afforded by the zinc is based on the fact that it is baser than the metallic material itself and therefore to start with undergoes corrosion itself. The metallic material itself remains intact as long as it is still covered by a continuous layer of zinc.

In the presence of atmospheric oxygen a thin oxide layer forms initially on the surface of Zn or Zn alloys, Al or Al alloys and slows the corrosive attack on the underlying metal to a greater or lesser degree depending on the external conditions.

In order to strengthen the protective effect of such an oxide layer, surfaces of Al and Zn are regularly subjected to an additional passivating treatment. In the course of such a treatment a fraction of the metal to be protected dissolves and is immediately reincorporated into an oxide film on the metal surface. This film is similar to the oxide film which is present in any case, but it offers greater protection. It is normally referred to as a passivating layer. In many cases it also improves the adhesion of paint layers applied to the metal. Instead of the term "passivating layer", therefore, the term "conversion coat" is often used synonymously, and sometimes also the term "pretreatment layer". Passivating layers are comparatively thin and normally have a thickness of not more than 3 μm.

In order to reinforce the corrosion protection it is common to apply additional (paint) layers to the passivating layer.

Such systems usually comprise a combination of two or more paint layers each of which serve different purposes. They serve, for example, to protect the passivating layer and the metal against corrosive gases and/or liquids and also against mechanical damage, such as stone chipping, for example, and of course also serve esthetic purposes. Paint layers are normally much thicker than passivating layers. Typical thicknesses range from 5 μm to 400 μm. The use of crosslinkers containing azirane, oxirane or thiirane groups in coating materials, paints or the like is known: from WO 01/30513, JP-A 2002/327096, JP-A 2003/027254 and JP-A 2002/326310 for example. As stated above, however, a paint system or coating is distinctly different from a passivation.

The passivation can be employed for permanent corrosion protection or else only for temporary corrosion protection. Temporary protection is used, for example, only for the storage or transportation of a metal sheet or other metallic workpiece and is removed again before final processing.

Passivating layers on zinc or aluminum surfaces have generally been obtained to date by treating the workpiece requiring protection with aqueous acidic solutions of $CrO_3$. The mechanism of such a passivation is complex. It includes the dissolution of metallic Zn or Al from the surface and its reprecipitation in the form of amorphous zinc-chromium oxides or aluminum-chromium oxides, respectively. The layers may, however, also comprise extraneous ions and/or further components from the treatment solution. In the case of treatment with chromic acid in particular it is impossible to rule out the incorporation into the passivating layer of a certain fraction of Cr(VI).

In order to avoid treatment with carcinogenic Cr(VI) solutions proposals have been made to carry out treatment with acidic aqueous Cr(Ill) solutions. By way of example reference may be made to U.S. Pat. No. 4,384,902 or WO 97/40208. Increasingly, however, there are customers on the market who require completely chromium-free processes for passivating. In order to avoid the use of Cr(VI) and Cr(III), the use of polymers is increasingly gaining in importance.

Chromium-free processes for passivation using organic polymers are known in principle.

DE-A 195 16 765 discloses a chromium-free and fluoride-free process for producing conversion coats on metallic surfaces of Zn or Al. The acidic solution used for passivation comprises a water-soluble polymer, phosphoric acid, and Al chelate complexes. The use of crosslinkers for passivation is not disclosed.

DE-A 197 54 108 discloses a chromium-free aqueous corrosion protection composition which comprises hexafluoro anions of Ti(IV) and/or Zr(IV), vanadium ions, cobalt ions, and phosphoric acid. As an option it is also possible for various film-forming polymers to be added. The use of crosslinkers is not disclosed.

DE-A 199 23 084 discloses a chromium-free aqueous corrosion protection composition which comprises hexafluoro anions of Ti(IV), Si(IV) and/or Zr(IV), an organophosphonic acid, and a water-soluble or water-dispersible, film-forming organic polymer or copolymer. The polymeric binders disclosed include acrylic acid and methacrylic acid, alongside a multiplicity of further polymers. Also disclosed, moreover, is the use of urea derivatives, epoxy resins, (blocked) polyisocyanates or oligomeric derivatives thereof as crosslinkers. Epoxy resins based on bisphenol A or F units and epichlorohydrin are, however, not water-soluble. In the case of the preferred embodiment of DE-A 199 23 084 a (meth)acrylate dispersion is used optionally in combination with an epoxy resin. Dispersions, though, are generally less suitable than are homogeneous solutions, since to start with the dispersing assistants and surfactants that are present in dispersions can be disruptive and, moreover, the low viscosity makes it very difficult to adjust the film thickness. Homogeneous systems are easier to handle, since the viscosity can be adjusted simply through the solvent content. The combination of a water-soluble polymer containing more than 50% by weight of (meth)acrylic acid units with a water-soluble crosslinker is not disclosed in DE-A 199 23 084.

EP-A 787 830 discloses a chromium-free composition for treating metallic surfaces which comprises an OH-containing organic resin, phosphoric acid, and at least one metal ion, e.g., Co, Cu, Fe, Mn, Sn or V. Included in the disclosure, in the examples, are copolymers which contain acrylic acid and/or methacrylic acid units. The amount of the (meth)acrylic acid units in the copolymers, however, is well below 50% by weight in every case. Additionally, acrylates in particular are used as comonomers. The copolymers disclosed are not homogeneously water-soluble polymers. The publication also mentions, as an option, the use of epoxy crosslinkers. The combination of a water-soluble polymer containing more than 50% by weight of (meth)acrylic acid units with a water-soluble crosslinker, though, is not disclosed.

JP-A 56-000279 discloses a Cr-free process for surface treatment, in which the surface of Zn or galvanized steel is treated with an aqueous solution of a polyamine and also of a metal salt of phytic acid. The use of crosslinkers is not disclosed.

In our to-date unpublished application DE 103 07 973.4 a description is given of the use of carboxylate-rich polymers for passivating metals. The use of crosslinkers is not disclosed.

As well as achieving very good corrosion protection, a chromium-free process for passivating is also required to meet a series of technical requirements.

Industrially, passivation is carried out, for example, by immersing the workpieces requiring passivation in a passivating solution. Loose workpieces (screws, for example) can be placed in a drum for this purpose, and the drum immersed. Larger workpieces can also be mounted on a suitable crane, and the frame immersed. With the dipping method the skilled worker is comparatively free to determine the contact time between the passivating solution and the workpiece, and hence even quite thick passivating layers can be obtained. The contact time may well be of the order of minutes. Where this technique is employed, more complex workpieces are usually assembled first—welded together from steel parts, for example—and then galvanized and passivated as a whole.

For producing sheetlike metallic workpieces such as automobile parts, bodywork parts, instrument casings, facade cladding, ceiling panels or window profiles, metal sheets are shaped by means of suitable techniques such as punching, drilling, folding, profiling and/or deep-drawing. Larger components, such as automobile bodies, for example, are assembled if appropriate by welding together a number of individual parts. The raw material for this purpose normally comprises long metal strips which are produced by rolling the metal and which for the purposes of storage and transportation are wound up to form what are called coils.

The galvanizing and passivation of such metal strips is carried out industrially in continuous plants. For galvanizing, first of all, the metal strip is run through a galvanizing apparatus, such as a trough of molten zinc, for example, and then directly through a further, passivating apparatus, again a trough, for example, or a rinsing apparatus. As a general rule, further process steps are carried out continuously: cleaning or rinsing steps, for example, or else the application of a first paint layer to the passivating layer. Typical speeds at which metal strips are run through the continuous plants are from 50 to 100 m/min. This means that the contact time between the metallic surface and the formulation used for passivating is short. Normally only a few seconds are available for the treatment. A process suitable industrially must therefore provide adequate results even with only short contact times.

It was therefore an object of the invention to provide an improved, substantially Cr-free process for passivating metallic surfaces of Zn, Zn alloys, Al or Al alloys which affords improved corrosion protection as compared with the prior art and in which only short contact times between the metallic surface and the formulation used for passivating are required in order to achieve a result which is nevertheless satisfactory. In particular it ought also to be possible to implement the process continuously.

The invention accordingly provides a substantially chromium-free process for passivating metallic surfaces of Zn, Zn alloys, Al or Al alloys by treating the surface of the metal with an acidic aqueous formulation of a polymer comprising —COOH groups and/or salts thereof, wherein the formulation (Z) used for the treatment at least comprises (a) at least one substantially noncrosslinked, water-soluble polymer or copolymer (A) comprising at least 50% by weight of (meth)acrylic acid units, and (b) water or an aqueous solvent mixture (B) comprising at least 50% by weight of water, and the surface is further treated with at least one water-soluble crosslinker, the crosslinker comprising at least 2 crosslinking groups selected from the group consisting of azirane, oxirane, and thiirane groups and joined to one another by means of a linking group (X) comprising at least 2 carbon atoms, the number-average molecular weight Mn of the crosslinker being from 112 to 5000 g/mol, and the treatment with the crosslinker being carried out before, after or simultaneously with the treatment with the formulation (Z).

In one preferred embodiment of the invention the metallic surface is the surface of a strip metal and, with further preference, the passivation is carried out by means of a continuous process.

The invention further provides a passivating layer on a metallic surface of Zn, Zn alloys, Al or Al alloys which is obtainable by the process, metallic surfaces comprising such a passivating layer, and a passivating formulation.

Details of the invention now follow:

The term "substantially chromium-free" for the purposes of this invention means that the actual passivating effect is brought about by the polymer used in combination with the crosslinker and, if appropriate, with further components of the formulation. This should not be construed, however, as ruling out the possibility that small amounts of chromium compounds are added in order to fine-tune the properties of the passivating layer. The amount should, however, not exceed 10% by weight, preferably 5% by weight, and more preferably 2% by weight, based on the amount of polymer used and crosslinker together, and in addition the amount of chromium, based on all of the constituents of the composition, ought not to exceed a level of 2% by weight, preferably 1% by weight, and more preferably 0.5% by weight. If chromium compounds are to be used they should preferably be Cr(III) compounds. The Cr(VI) content should in any case, however, be kept so low that on the passivated metal the Cr(VI) content does not exceed 1 $mg/m^2$.

The formulation used for passivating preferably comprises no Cr(VI) and more preferably no chromium compounds at all, and in no other process step either are chromium compounds deliberately used, irrespective of their oxidation state. Even in this case, however, it is possible for small amounts of chromium to be entrained into the process indirectly and per se unintentionally. For instance, if zinc alloys or aluminum alloys are used for the process of the invention that comprise chromium as an alloying ingredient, or galvanized steel in which the iron has been alloyed with chromium, it always remains within the bounds of the possible that small amounts of chromium in the metal to be treated will be dissolved by the formulation used for the process and may therefore pass into the formulation unintentionally per se. Even in the case where such metals are used, with the resultant consequences, the process should still be regarded as "substantially chromium-free".

The metallic surfaces which are passivated by means of the process of the invention are surfaces of Zn, Zn alloys, Al or Al alloys. They may be the surfaces of structures or workpieces composed entirely of said metals and/or alloys. Alternatively they may be the surfaces of structures coated with Zn, Zn alloys, Al or Al alloys, it being possible for the structures to be composed of other materials: other metals, alloys, polymers or composites, for example. The surface in question may in particular be that of galvanized iron or steel. In one particular embodiment of the process it is the surface of a strip metal, in particular electrolytically galvanized or hot-dip galvanized steel.

Zn alloys or Al alloys are known to the skilled worker. The skilled worker selects the type and amount of alloying constituents in accordance with the desired end application. Typical constituents of zinc alloys comprise in particular Al, Pb, Si, Mg, Sn, Cu or Cd. Typical constituents of aluminum alloys comprise in particular Mg, Mn, Si, Zn, Cr, Zr, Cu or Ti. The alloys in question can also be Al/Zn alloys in which Al and Zn are present in approximately equal amounts. Steel coated with such alloys is available commercially.

The formulation (Z) used for passivating comprises at least one water-soluble noncrosslinked polymer or copolymer (A) which comprises at least 50% by weight of (meth)acrylic acid units (al). The COOH groups may also be wholly or partly in the form of salts: ammonium or Na salts, for example.

The term "water-soluble" for the purposes of this invention is intended to denote that the polymer(s) or copolymer(s) (A) used are to be homogeneously water-soluble. Aqueous dispersions of crosslinked particles of inherently water-insoluble polymers are not included in the scope of this invention.

The (co) polymers used ought preferably to be infinitely miscible with water, even if this is not absolutely necessary in every case. They must, however, be water-soluble at least to an extent such that passivation by means of the process of the invention is possible. In general the (co)polymers used ought to have a solubility of at least 50 g/l, preferably 100 g/l, and more preferably at least 200 g/l.

The skilled worker in the field of water-soluble polymers is aware that the solubility of COOH-containing polymers in water may be dependent on the pH. The reference point chosen should therefore in each case be the pH which is desired for the particular end use. A (co)polymer which at one pH has a solubility which is inadequate for the intended end use may have an adequate solubility at a different pH.

The polymer or copolymer (A) may comprise polyacrylic acid or polymethacrylic acid alone.

Preferably, however, (A) is a copolymer which comprises from 50 to 99% by weight of (meth)acrylic acid units (Aa) and also from 1 to 50% by weight of at least one further ethylenically unsaturated comonomer other than (meth) acrylic acid.

The copolymer comprises preferably from 60 to 95% by weight, more preferably from 65 to 90% by weight, and very preferably from 70 to 85% by weight of (meth)acrylic acid units (Aa).

The comonomers are required to meet a number of requirements: they must be copolymerizable with (meth)acrylic acid and, if appropriate, with further comonomers. In addition the copolymer (A) must also be water-soluble.

The at least one comonomer is in particular at least one comonomer (Ab) which is different than (meth)acrylic acid and which has an ethylenically unsaturated group and an acidic group. The groups in question may likewise be carboxylate groups, but can also be other acidic groups such as phosphoric acid, phosphonic acid or sulfonic acid groups, for example. The comonomers may in each case have only identical acidic groups or else different kinds of acidic groups. It is of course also possible to use two or more different comonomers (Ab) containing acidic groups.

Examples of comonomers (Ab) comprise COOH-containing acids of the general formula $RHC{=}CH{-}(CH_2)_n{-}COOH$ with n=1 to 8 and R=H or $C_1$ to $C_3$, such as vinylacetic acid, crotonic acid or isocrotonic acid, unsaturated acids containing two COOH groups, such as maleic acid or fumaric acid, acids containing phosphonic acid groups, such as vinylphosphonic acid, allylphosphonic acid or 3-butenylphosphonic acid, acids containing phosphoric acid groups, such as monovinyl phosphate, monoallyl phosphate, mono-3-butenyl phosphate or phosphonoxyethyl (meth)acrylate, or acids containing sulfonic acid groups, such as styrenesulfonic acid, for example.

Examples of particularly suitable comonomers (Ab) comprise maleic acid, fumaric acid, and vinylphosphonic acid.

There are preferably from 2 to 50% and more preferably from 5 to 40% by weight of further comonomers (Ab) present.

The copolymer (A) may further comprise one or more comonomers (Ac) which comprise an ethylenically unsaturated group but no acidic group. Examples of such monomers comprise olefins such as ethylene, propylene or styrene, esters of vinyl alcohol and monocarboxylic acids, in particular such as vinyl acetate or vinyl propionate, and also, moreover, in particular (meth)acrylates having any of a very wide variety of alcohol residues, such as methyl (meth)acrylate, ethyl (meth)acrylate, n-butyl (meth)acrylate or 2-ethylhexyl (meth)acrylate. The monomers in question can also be monomers containing OH groups, such as p-vinylphenol, for example, or, in particular, ethoxylated or propoxylated (meth) acrylic acid.

The comonomers (Ac) are used to fine-tune the properties. If present, their amount is hence determined in accordance with the desired properties of the polymers: their solubility, for example. In general, however, the amount should not exceed 30% by weight, preferably 20% by weight, more preferably 10% by weight, and very preferably 5% by weight.

The copolymers (A) can be prepared in accordance with procedures which are known to the skilled worker. Preference is given to preparing the polymers and/or copolymers by free-radical copolymerization of the abovementioned components (Aa) and also, if appropriate, (Ab) and/or (Ac). Monomers having more than one ethylenically unsaturated group, which hence have a crosslinking action, can be used in special cases to fine-tune the properties. If used at all, however, they should be used in a very small amount, so that the polymer remains substantially noncrosslinked. The amount of a crosslinking monomer ought generally not to exceed 1% by weight, preferably 0.5% by weight, and preferably none at all is used.

The polymers can also be prepared by using, in the case of the acidic monomers, not the free acids but instead the acids in the form of their salts, esters, anhydrides or other hydrolyzable derivatives for the polymerization. Free acid groups can then be obtained from these derivatives in a separate step by hydrolysis, using suitable bases if appropriate. Maleic acid in particular is normally polymerized in the form of maleic anhydride and is hydrolyzed only after polymerization or possibly even only in the formulation itself.

There is no restriction in principle on the average molecular weight of the (co)polymers used provided the (co)polymers are still homogeneously water-soluble to a sufficient extent. The average molecular weight is determined by the skilled worker in accordance with the desired end application. Through the choice of a particular molecular weight it is possible for the skilled worker to influence, for example, the viscosity of the formulation and to adjust it purposively for the desired end. In general the weight average $M_w$ of the polymers is from 500 to 2 000 000 g/mol, preferably from 1000 to 1 000 000, more preferably from 2000 to 500 000 g/mol, and very preferably from 3000 to 300 000 g/mol.

With particular preference the copolymer (A) is a copolymer synthesized from (meth)acrylic acid and maleic anhydride, in particular from 70 to 80% by weight of (meth)acrylic acid and from 20 to 30% by weight of maleic anhydride.

With further preference it is possible besides (meth)acrylic acid and maleic anhydride to use vinylphosphonic acid as a further comonomer in amounts of from 1 to 30% by weight, preferably from 1 to 20% by weight, and more preferably from 1 to 10% by weight. A preferred copolymer may be synthesized, for example, from 70 to 80% by weight of (meth) acrylic acid, 15 to 25% by weight of maleic anhydride, and from 1 to 10% by weight of vinylphosphonic acid.

The maleic anhydride units are hydrolyzed immediately at the beginning, in parallel with or following the polymerization, to form maleic acid units, preferably using a base such as triethanolamine, for example.

As component (b) the formula (Z) used for the process of the invention comprises preferably only water or an aqueous solvent mixture comprising at least 50% by weight of water. If an aqueous mixture is used the mixture comprises preferably at least 65% by weight, more preferably at least 80% by weight, and very preferably at least 95% by weight of water. The amounts are based in each case on the total amount of all solvents. Further components of a mixture are water-miscible solvents. Examples comprise monoalcohols such as methanol, ethanol or propanol, higher alcohols such as ethylene glycol or polyether polyols and ether alcohols such as butyl glycol or methoxypropanol.

Preferably only water is used as solvent.

The concentration of the polymers or copolymers (A) in the formulation is determined by the skilled worker in accordance with the desired end application. The thickness of the passivating layer, for example, depends on the chosen process technique but also, for example, on the viscosity of the composition used for passivating. In general a concentration of from 0.01 g/l to 500 g/l has proven suitable, preferably from 0.1 g/l to 200 g/l, and more preferably from 0.5 g/l to 5 g/l. The concentrations reported refer to the ready-to-use formulation. It is generally possible first to prepare a concentrate which then in situ is diluted with water or, optionally, other solvent mixtures to the desired concentration.

The formulation (Z) used in accordance with the invention is acidic. It generally has a pH of from 1 to 6, although narrower pH ranges can be chosen depending on the substrate and the type of application and also on the period of exposure of the surface to the formulation (Z). For the treatment of aluminum surfaces, for example, the pH is adjusted preferably to the range from 2 to 4 and, when treating zinc or galvanized steel, preferably to the range from 2 to 5.

The pH of the formulation can in one case be controlled by the nature and concentration of the COOH-containing polymers or copolymers and hence comes about automatically.

Alternatively, the formulation may optionally further comprise at least one organic or inorganic acid or mixtures thereof. Examples of suitable acids comprise phosphorus, sulfur or nitrogen acids such as phosphoric acid, phosphonic acid, sulfuric acid, sulfonic acids such as methanesulfonic acid, amidosulfonic acid, p-toluenesulfonic acid, m-nitrobenzenesulfonic acid, and derivatives thereof, nitric acid, hydrofluoric acid, hydrochloric acid, boric acid, formic acid, oxalic acid or acetic acid. The acid is preferably selected from the group consisting of $HNO_3$, $H_2SO_4$, $H_3PO_4$, formic acid, and acetic acid. Particular preference is given to $H_3PO_4$ and/or $HNO_3$. It is of course also possible to use mixtures of different acids.

The nature and concentration of the acid in the formulation (Z) is determined by the skilled worker in accordance with the desired end application and pH. A concentration of from 0.01 g/l to 30 g/l has proven suitable generally, preferably from 0.05 g/l to 3 g/l, and more preferably from 0.1 g/l to 5 g/l.

In accordance with the invention at least one water-soluble crosslinker is used additionally for the process, the crosslinker comprising at least 2 crosslinking groups selected from the group consisting of azirane, oxirane, and thiirane groups. In general the crosslinkers used contain only one kind of crosslinking groups in each case, although in special cases deviations from this rule may be possible. When two or more different crosslinkers are used it is likewise preferred for them to contain only one kind of crosslinking groups.

The crosslinkers used ought preferably to be infinitely miscible with water, although this is not absolutely necessary in every case. They must, however, be water-soluble at least to an extent such that passivation by means of the process of the invention is possible. In general the crosslinkers used ought to have a solubility in water of at least 10 g/l, preferably 30 g/l, and more preferably at least 60 g/l.

The number-average molecular weight $M_n$ of the crosslinker is from 112 to about 5000 g/mol, preferably from 150 to 2500 g/mol, and more preferably from 200 to 2000 g/mol.

The at least two crosslinking groups are joined to one another by means of a linking group X comprising at least 2 carbon atoms. In the case of oxirane and thiirane groups, naturally, linking is possible only in position 2 or 3 of the three-membered ring. In the case of azirane groups the 1 position is a further option. This is also the preferred position. Preference is given to oxirane or azirane crosslinkers.

The linking group X can be a straight-chain, branched or cyclic aliphatic, aromatic or araliphatic group which may also contain additional heteroatoms or substituents. Preferably the linking group is a straight-chain or branched aliphatic group in which nonadjacent carbon atoms may also be replaced by oxygen atoms.

The crosslinkers comprise at least 2 crosslinking groups. There is in principle no upper limit on the number of crosslinking groups. However, a number of 2 to 20, preferably 2 to 10, and more preferably 3 to 6 crosslinking groups has proven suitable.

Crosslinkers which have proven especially suitable for implementing the present invention are crosslinkers of the general formula (I)

(I)

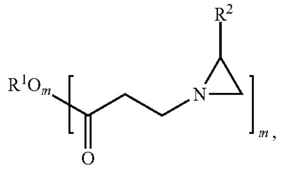

which contain at least two azirane groups and where m is a natural number ≧2. Preferably m is a natural number from 2 to 6. $R^2$ is H and/or a methyl group. A crosslinker molecule preferably comprises only the same radicals $R^2$ on the crosslinking groups, and with particular preference $R^2$ is a hydrogen atom.

The radical $R^1O_m$— is an m-valent aliphatic alkoxy radical. The radical has at least m oxygen atoms, to which the m radicals of the general formula (Ia)

(Ia)

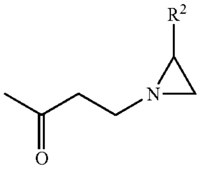

are attached. In other words, the azirane groups are each joined via linking groups to the radial $R^1O_m$—.

The aliphatic alkoxy radicals $R^1O_m$— may have further oxygen atoms or other heteroatoms such as N, for example, in the radical $R^1$. They are derived from the corresponding aliphatic alcohols $R^1(OH)_{m'}$, where m' is ≧m.

Examples of suitable alcohols comprise glycol, propanediol, butanediol, butenediol, butynediol, pentanediol, hexanediol, diglycol, triglycol, oligoethylene or polyethylene glycol, glycerol, polypropylene glycol, neopentyl glycol, polyglycerol, trimethylolmethane, trimethylolethane, trimethylolpropane, 1,2,4-butanetriol, tris(hydroxymethyl)amine, tris(hydroxyethyl)amine, tris(hydroxypropyl)amine, pentaerythritol, bis(trimethylolpropane) or sugars, such as glucose or sorbitol, for example. The alcohols may also be reacted with ethylene oxide, propylene oxide or butylene oxide to form polyetherols with a functionality of two or more. Preference is given to using exclusively ethoxylated products. In the case of the alcohols the compounds in question may also be oligomers or polymers of suitable molecular weight which comprise vinyl alcohol units, such as polyvinyl alcohol or polyvinyl alcohol copolymers, for example.

Suitable with preference for the implementation of this invention are glycol, butanediol, glycerol, trimethylolethane, trimethylolpropane, 1,2,4-butanetriol, pentaerythritol, and polyetherols thereof based on ethylene oxide; trimethylolpropane is particularly preferred.

For preparing the crosslinkers of the general formula (I) it is possible first of all to react an m'-valent alcohol of the general formula $R^1(OH)_{m'}$, with (meth)acrylic acid or with a suitable (meth)acrylic acid derivative to form a (meth)acrylic ester. It is not necessary for all the OH groups of the alcohol to be reacted, provided at least 2 are reacted. Particularly suitable for implementing this reaction is (meth)acrylic anhydride. The ester obtained is reacted in a second step with azirane or 2-methylazirane, the azirane undergoing a Michael addition to the double bond of the (meth)acrylic acid unit. Crosslinkers of formula (I) which comprise azirane groups are also available commercially, as Corial® curing agents (BASF AG), for example.

Crosslinkers which have proven suitable in another embodiment of the invention are crosslinkers of the general formula (II)

(II)

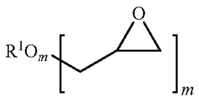

which contain two oxirane groups and where m is a natural number ≧2. Preferably m is a natural number from 2 to 6.

The abbreviation $R^1O_m$— in the above formula has the definition set out above. Preferred radicals in the crosslinkers (II) are derived from glycerol, oligoglycerols, especially diglycerol or triglycerol, glycol or polyethylene glycols of the general formula $HO—(CH_2—CH_2—O)_n—H$, where n is preferably from 2 to 25.

For preparing the crosslinkers of the formula (II) a polyalcohol of the general formula $R^1(OH)_{m'}$, can be reacted with glycidyl chloride. It is not necessary for all the OH groups of the alcohol to be reacted, provided at least 2 are reacted. Various crosslinkers of the formula (II) comprising oxirane groups are available commercially, under the brand name Denacol® (Nagase Chemicals Ltd.), for example.

From among the crosslinkers which are possible in principle the skilled worker will make an appropriate selection in accordance with the desired passivating conditions and the desired properties of the passivating layer.

The water-soluble crosslinkers used in accordance with the invention may be present in solution in the formulation (Z), so that treatment of the metallic surface with the crosslinker and treatment with the formulation take place simultaneously.

An alternative option is to treat the surface with the crosslinker in a separate step before and/or after the treatment with the formulation. This option is especially advisable if the crosslinker in the chosen formulation and under the chosen passivating conditions is not entirely inert but instead reacts with the components of the formulation. Unwanted reactions are also advantageously avoided by not mixing the crosslinker into the formulation until immediately prior to application.

The ratio of the crosslinker to the polymer is determined by the skilled worker in accordance with the desired properties. A weight ratio of polymer to crosslinker which has proven suitable is in general from 0.05:1 to 50:1, preferably from 0.1 to 20:1, and more preferably from 0.5:1 to 10:1.

In addition to the components specified, the formulation may optionally comprise further components.

The components optionally present may include, for example, transition metal ions and transition metal compounds, of Ce, Ni, Co, V, Fe, Zn, Zr, Ca, Mn, Mo, W, Ti, Zr, Hf, Bi, Cr and/or the lanthanides, for example. If Cr is present the amounts defined at the outset should not be exceeded. Preferably no Cr(VI) compounds are used, and with particular preference no chromium compounds at all. The compounds in question may also be compounds of main group elements, such as Si and/or Al, for example. The compounds can be used, for example, in the form of the respective aqua complexes. Complexes with other ligands are also possible, however, such as fluoride complexes of Ti(IV), Zr(IV) or Si(IV), for example, or oxometallates such as $MoO_4^{2-}$ or $WO_4^{2-}$, for example. It is additionally possible to use complexes with typical chelate-forming ligands such as ethylenediaminetetraacetic acid (EDTA), diethylenetriaminepentaacetic acid (DTPA), hydroxyethylethylenediaminetriacetic acid (HEDTA), nitrilotriacetic acid (NTA) or methylglycinediacetic acid (MGDA).

Further optional components comprise surface-active compounds, corrosion inhibitors or typical electroplating auxiliaries.

The skilled worker will make an appropriate selection from among the optional components that are possible in principle, and their quantities, in accordance with the desired application.

In the process of the invention for passivating metallic surfaces the surface of the metal is treated with the formulation (Z) and also with the crosslinker by means, for example, of spraying, dipping or rolling. After a dipping operation excess treatment solution can be removed from the workpiece by allowing it to drip dry; in the case of metal sheets, metal foils or the like, excess treatment solution can alternatively be removed by squeezing off or squeegeeing, for example. In the course of the treatment parts at least of the polymer used and also further components of the formulation are chemisorbed by the surface of the metal, so that a solid bond comes about between the surface and the components. Treatment with the formulation takes place generally at room temperature, although this is not intended to rule out the possibility of higher temperatures in principle.

If the crosslinker is not present in the formulation it is preferably likewise dissolved in water and applied to the metal surface by spraying, rolling or dipping, for example, before and/or after the treatment with the formulation without crosslinker. It is of course also possible for some of the crosslinker to be present in the formulation while a second fraction of the crosslinker is applied in a separate step.

The treatment can be what is called a no-rinse operation, in which the treatment solution is dried directly in a drying oven immediately following its application, without rinsing.

It is also possible, however, to rinse the surface, after treatment, with a cleaning liquid, in particular with water, in order to remove residues of the formulation used in accordance with the invention from the surface.

The crosslinking of the polymer by the crosslinker can also take place at room temperature. Preferably, however, following the treatment of the metal with the formulation and with the crosslinker, the metal surface is heated. A temperature of from 30° C. to 120° C. has proven suitable here, preferably from 40° C. to 100° C., and more preferably from 50° C. to 80° C.

The treatment of the metal surface with the formulation and the crosslinker can take place discontinuously or, preferably, continuously. A continuous process is particularly suitable for treating strip metals. The metal strip is run through a trough or a spraying apparatus with the formulation and also, optionally, through a trough or spraying apparatus for the crosslinker and also, optionally, through further pretreatment or after treatment stations.

The treatment time is specified by the skilled worker in accordance with the desired properties of the layer, the composition used for the treatment, and the technical boundary conditions. It may be considerably less than one second or may be two or more minutes. In the case of the continuous process it has proven particularly suitable to contact the surface with the formulation for a time of from 1 to 60 s.

Whether the crosslinker is added to the formulation or is used to treat the metal surface in a separate step is something which the skilled worker decides depending on the desired result and on the circumstances. The use of a formulation which already comprises the crosslinker is simpler and less expensive to implement, since there is no need for a separate second process step.

The treatment with the formulation and with the crosslinker in two (or three) separate process steps, on the other hand, has the advantage that it provides a greater number of technical degrees of freedom in the process, which can be utilized for particular effects.

The crosslinker-comprising formulation can generally not be heated to relatively high temperatures, or at least not for a relatively long time, since otherwise parts at least of the crosslinker will react, prematurely and unwantedly, with the polymer, with other constituents of the formulation, or with themselves. Unwanted side reactions of this kind may result in deterioration in the properties of the passivating layer, and in a worst-case scenario results that are completely unusable may even be obtained. In that case the treatment must therefore normally take place essentially at room temperature.

If the treatment with the crosslinker is carried out in a separate step then the treatment with the formulation can be performed at much higher temperatures, from 50 to 80° C. for example, without fear of unwanted reactions of the crosslinker. By this means it is possible to accelerate the formation of the passivating layer and/or to influence other properties of the passivating layer, such as its thickness, for example. In this case treatment with the crosslinker takes place in a separate step: with a solution of the crosslinker at room temperature, for example. It can take place after or else before the treatment with the formulation.

The process of the invention may optionally also comprise one or more pretreatment steps. For example, prior to passivation, the metallic surface can be cleaned with the formulation used in accordance with the invention in order to remove greases or oils, for example. It is also possible to pickle it prior to passivation, in order to remove oxide deposits, scale, temporary corrosion protection, and the like. It is additionally necessary to rinse the surface, with water if appropriate, after and between such pretreatment steps, in order to remove the residues of rinsing solutions or pickling solutions.

By means of the process of the invention a passivating layer on a metallic surface made of Zn, Zn alloys, Al or Al alloys is obtainable. The precise structure and composition of the passivating layer are unknown to us. However, in addition to the customary amorphous oxides of aluminum or of zinc and also, if appropriate, of other metals, said structure and composition comprise the reaction products of the polymer and also of the crosslinker and, if appropriate, of further components of the layer. The composition of the passivating layer is not homogeneous; rather, the components appear to exhibit concentration gradients.

The thickness of the passivating layer is adjusted by the skilled worker in accordance with the desired properties of the layer. In general the thickness is from 0.01 to 3 μm, preferably from 0.1 to 2.5 μm, and more preferably from 1 to 2 μm. The thickness can be influenced, for example, via the nature and amount of the components applied and also by way of the exposure time. In addition, it is possible to use technical parameters of the process to influence the thickness: by using rollers or squeegees to remove treatment solution applied in excess, for example.

The thickness of the layer is determined by differential weighing before and after exposure of the metal surface to the composition used in accordance with the invention, on the assumption that the layer has a specific density of 1 kg/l. In the text below, "layer thickness" always refers to a variable determined in this way, irrespective of the actual specific density of the layer. These thin layers are enough to obtain outstanding corrosion protection. Thin layers of this kind ensure that the dimensions of the passivated workpieces are maintained.

The present specification further provides a metallic surface which comprises the passivating layer of the invention. The passivating layer is applied directly on the actual metal surface. In one preferred embodiment the metal surface in question is that of stripped metal made of steel which comprises a coating of Zn or of a Zn alloy and on which a passivating layer of the invention has been applied.

The metallic surface with its passivating layer may in principle be overcoated in a known manner with one or more color or effect paint layers. Typical paints, their composition, and typical layer sequences in the case of two or more paint layers are known in principle to the skilled worker.

Through the use in accordance with the invention of a water-soluble crosslinker it is possible to increase the effectiveness of the passivating layer considerably as compared with layers without crosslinker.

The examples which follow are intended to illustrate the invention in more detail:

GENERAL EXPERIMENTAL DESCRIPTION

For the inventive and comparative examples panels of galvanized steel (20 μm zinc plating on one side) were used.

In the examples the following panel pretreatment was chosen: Unpassivated steel panels were dipped for 10 s in a cleaning solution comprising 0.5% of HCl and 0.1% of an alkylphenol ethoxylate with 10 ethylene oxide units, rinsed immediately with water, and then dried with nitrogen.

Preparation of the compositions for passivating: 5% strength aqueous solutions of each of the polymers used were homogenized and charged to a dipping bath. The solutions additionally comprised 0.1% by weight of $HNO_3$ or of $H_3PO_4$. The precleaned metal panels were immersed for 10 s and dried at room temperature. Finally the edges of the passivated panels were masked in order to rule out edge effects.

The panels were passivated as described below.

The thickness of the passivating layer was determined by differential weighing before and after exposure of the metal surface to the composition used in accordance with the invention, on the assumption that the layer has a specific density of 1 kg/l. In the text below, "layer thickness" always refers to a variable determined in this way, irrespective of the actual specific density of the layer.

The corrosion inhibition effect was determined by means of a salt spray test in accordance with DIN 50021. The withstand time in the corrosion test is defined in accordance with the type of corrosion damage that is observed:

If white spots of generally more than 1 mm in diameter (Zn oxide or Al oxide, known as white rust) are formed, the withstand time reported is the time after which the appearance of the damage corresponds to evaluation level 8 in DIN EN ISO 10289 of April 2001, annex B, page 19.

If black spots of generally less than 1 mm in diameter form before white rust spots, the withstand time reported is the time after which the appearance of the damage corresponds to evaluation level 8 in DIN EN ISO 10289 of April 2001, annex A, page 9.

INVENTIVE EXAMPLE 1

Passivating layer with aziridine crosslinker (I) and acrylic acid copolymer

Single dipping for 10 s in a 5% strength by weight ethanolic solution of trimethylolpropane tris(beta-aziridino)propionate (solubility of the crosslinker in water: 60 g/l). The layer thickness is 0.6 μm.

Subsequent repeat dipping for 10 s at RT in a 5% strength aqueous solution of poly(acrylic acid-co-maleic acid) in 0.1% $HNO_3$ with a weight-based monomer composition of 80:20 at a pH of 3.5 set using triethanolamine. After 5-minute drying/curing at room temperature the panel shows no changes in terms of color or metallic luster from the original panel. The layer thickness is 1.8 μm (polymer+crosslinker together).

A salt spray test up to evaluation 8 was carried out in a 5% salt spray mist atmosphere at 35° C. The residence time/withstand time to evaluation 8 was 50 h. The results are summarized in table 1.

INVENTIVE EXAMPLE 2

Passivating layer with aziridine crosslinker [I] and acrylic acid copolymer

Single dipping for 10 s at RT in a 5% strength aqueous formulation comprising solution 1 (85% by weight of trimethylolpropane tris(beta-aziridino)propionate, 7.5% of diacetone alcohol and 2.5% of triethylenediamine) and drying the panel at room temperature.

Subsequent repeat dipping in solution 2 (5% strength aqueous poly(acrylic acid-co-maleic acid) solution as in example 1). After 5-minute drying/curing at room temperature, the panel shows no changes in color or metallic luster from the original panel. The layer thickness is in total 1.65 μm.

A salt spray test was carried out as described above. The residence time was 50 h. The results are summarized in table 1.

INVENTIVE EXAMPLE 3

Passivating layer with oxirane crosslinker [II] and acrylic acid copolymer

Single dipping for 10 s at RT in a 5% strength aqueous poly(acrylic acid-co-maleic acid) solution with a weight-based monomer composition of 80:20 at a pH of 3.5, set using triethanolamine, and the crosslinker glycerol diglycidyl ether (Denacol® 313, solubility of the crosslinker in water: 100 g/l) in 0.1% $HNO_3$. The weight ratio of polymer to crosslinker is 32:68.

After 5-minute drying/curing at 80° C., the panel shows no changes in color or metallic luster from the original panel. The layer thickness is 1.4 μm.

A salt spray test was carried out as described above. The residence time was 29 h. The results are summarized in table 1.

COMPARATIVE EXAMPLE 1

Passivation layer with acrylic acid copolymer

Single dipping for 10 s at 40° C. in a 5% strength aqueous poly(acrylic acid-co-maleic acid) solution with a weight-based monomer composition of 80:20 and a pH of 3.5, set using triethanolamine. After 5-minute drying/curing at 70° C. the panel shows no changes in color or metallic luster from the original panel. The layer thickness is 1.1 μm.

Residence time up to evaluation 8 in a 5% salt spray mist atmosphere at 30° C. is 21 h.

COMPARATIVE EXAMPLES 2 and 2a

Treatment of metal only with $HNO_3$ (ex. 2) or $H_3PO_4$ (ex. 2a)

Single dipping for 10 s at RT in a 0.1% strength aqueous phosphoric acid or nitric acid solution.

The residence time up to evaluation 8 in a 5% salt spray mist atmosphere at 30° C. is <2 h in each case.

COMPARATIVE EXAMPLE 3

Passivating layer with acrylic acid copolymer and bisphenol A diglycidyl ether

Single dipping for 10 s at RT in a 5% strength by weight ethanolic solution of bisphenol A diglycidyl ether. The layer thickness is 1.6 μm.

Single dipping for 10 s at 40° C. in a 5% strength aqueous poly(acrylic acid-co-maleic acid) solution with a weight-based monomer composition of 80:20 at a pH of 3.5, set using triethanolamine, in 0.1% $HNO_3$. After 5-minute drying/curing at 70° C. the panel shows spotty and dark changes in color and in metallic luster in comparison with the original panel.

The total layer thickness (crosslinker+polymer together) is 2.2 μm.

Residence time up to evaluation 8 in a 5% salt spray mist atmosphere at 30° C. is 19 h.

COMPARATIVE EXAMPLE 4

Passivating layer of azirane crosslinker [I]

Single dipping for 10 s in a 5% strength by weight ethanolic solution of trimethylolpropane tris(beta-aziridino)propionate. The layer thickness is 1.0 μm.

Residence time up to evaluation 8 in a 5% salt spray mist atmosphere at 30° C. is <2 h.

The crosslinker alone does not produce any effect, and the polymer alone shows a much poorer effect than the combination of crosslinker and polymer.

With water-insoluble oxirane crosslinkers of the bisphenol A type only a nonhomogeneous layer is obtained. Despite a considerably greater thickness this layer actually shows a deterioration in comparison to an experiment without the use of crosslinker.

We claim:

1. A substantially chromium-free process for passivating metallic surfaces of Zn, Zn alloys, Al or Al alloys by treating the surface with an acidic aqueous formulation having a pH of from 1 to 6 of a polymer comprising —COOH groups and/or salts thereof wherein the formulation (Z) used for the treatment at least comprises (a) at least one substantially noncrosslinked, water-soluble copolymer (A) comprising at least 50% by weight of (meth)acrylic acid units and 5 to 40% by weight of at least one comonomer which comprises acidic groups but is other than (meth)acrylic acid, in a concentration of from 0.1 g/l to 200 g/l, and (b) water or an aqueous solvent mixture (B) comprising at least 80% by weight of water, and the surface is further treated with at least one water-soluble crosslinker, the crosslinker comprising at least 2 crosslinking groups selected from the group consisting of azirane, oxirane, and thiirane groups and joined to one another by means of a linking group (X) comprising at least 2 carbon atoms, the number-average molecular weight $M_n$ of the crosslinker being from 112 to 5000 g/mol, the solubility of the crosslinker in water being at least 10 g/l, and the treatment with the crosslinker being carried out before, after or simultaneously with the treatment with the formulation (Z), wherein a passivating layer on the metallic surface is obtained whose thickness is from 0.01 to 3 micrometer, and

TABLE 1

Results of the inventive and comparative experiments

| No. | Polymer | Crosslinker | Remarks | Layer thickness [μm] | Withstand time in the salt spray test [h] until damage type 8 | Standardized withstand time (=withstand time/layer thickness) [h/μm] |
|---|---|---|---|---|---|---|
| Inventive example 1 | Acrylic acid/maleic acid copolymer | Azirane crosslinker | First treatment with crosslinker, then polymer | 1.8 | 50 | 28 |
| Inventive example 2 | Acrylic acid/maleic acid copolymer | Azirane crosslinker | First treatment with crosslinker, then polymer | 1.65 | 50 | 30 |
| Inventive example 3 | Acrylic acid/maleic acid copolymer | Oxirane crosslinker | Polymer and crosslinker simultaneously | 1.4 | 29 | 21 |
| Comparative example 1 | Acrylic acid/maleic acid copolymer | — | No crosslinking | 1.1 | 21 | 19 |
| Comparative example 2 | — | — | Only with 0.1% strength nitric acid | — | <2 | 0 |
| Comparative example 3 | Acrylic acid/maleic acid copolymer | Bisphenol A | Spotty, dark | 2.2 | 19 | 8 |
| Comparative example 4 | — | Azirane crosslinker | Crosslinker only | 1.0 | <2 | 2 |

The present examples show that through the use of crosslinkers it is possible to achieve drastic improvements in the corrosion sensitivity of zinc surfaces by chemically stabilizing the passivating polyacrylate layer using reactive crosslinkers. High-reactivity polyfunctional azirane or oxirane crosslinkers are suitable for this purpose. The azirane crosslinkers can be used even at room temperature, owing to their reactivity, and have a more intense activity than the oxirane crosslinkers.

wherein the pH of the formulation is controlled by the nature and concentration of the (meth)acrylic acid units and the at least one comonomer which comprises acidic groups but is other than (meth)acrylic acid.

2. The process according to claim 1, wherein the treatment with the crosslinker and with the formulation (Z) is carried out simultaneously and the crosslinker is present in the formulation (Z).

3. The process according to claim 1, wherein (Z) further comprises an organic or inorganic acid.

4. The process according to claim 3, wherein the acid is $H_3PO_4$ and/or $HNO_3$.

5. The process according to claim 1, wherein the crosslinker is a crosslinker of the general formula (I)

(I)

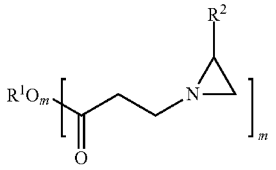

which contains at least two azirane groups and where m is a natural number ≧2, $R^1O_m$— is an m-valent, aliphatic alkoxy radical, and $R^2$ is H or methyl.

6. The process according to claim 5, wherein m is a natural number from 2 to 6.

7. The process according to claim 1, wherein the crosslinker is a crosslinker of the general formula (II)

(II)

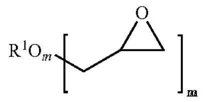

which contains at least two oxirane groups and where m is a natural number ≧2, and $R^1O_m$— is an m-valent, aliphatic alkoxy radical.

8. The process according to claim 1, wherein the weight ratio of polymer to crosslinker is from 0.5:1 to 50:1.

9. The process according to claim 1, wherein the solvent is water.

10. The process according to claim 1, wherein subsequently the metal surface is heated after the treatment.

11. The process according to claim 1, wherein the treatment takes place by means of rolling, spraying or dipping methods.

12. The process according to claim 1, wherein the metal surface is the surface of a strip metal.

13. The process according to claim 12, wherein the strip metal is electrolytically galvanized or hot-dip galvanized steel.

14. The process according to claim 12, wherein the treatment is carried out by means of a continuous process.

15. The process according to claim 12, wherein the surface is contacted with the formulation for a time of from 1 to 60 s.

16. The process according to claim 1, further comprising synthesizing the copolymer A from 70 to 80% by weight of (meth)acrylic acid and from 20 to 30% by weight of maleic anhydride.

17. The process according to claim 1, further comprising synthesizing the copolymer A from 70 to 80% by weight of (meth)acrylic acid, from 15 to 25% by weight of maleic anhydride, and from 1 to 10% by weight of vinylphosphonic acid.

18. The process according to claim 1, wherein the copolymer A further comprises a monomer containing OH-groups.

* * * * *